Dec. 10, 1929.                C. H. TWETTEN                1,738,975
                       SIGNAL CONTROL FOR AUTOMOBILES
                            Filed March 24, 1923

INVENTOR:
Clarence H. Twetten.
BY A. M. Carlsen.
        ATTORNEY.

Patented Dec. 10, 1929

1,738,975

UNITED STATES PATENT OFFICE

CLARENCE H. TWETTEN, OF ROUND LAKE, MINNESOTA, ASSIGNOR OF ONE-THIRD TO ALEXANDER M. HUDSON, OF ROUND LAKE, MINNESOTA

SIGNAL-CONTROL FOR AUTOMOBILES

Application filed March 24, 1923. Serial No. 627,301.

My invention relates to automobile direction signals and controlling means therefor. The object is to provide a simple and efficient device by means of which direction signals on various parts of an automobile are lighted as desired when a driver is to make a turn to the right or left.

Figure 1:
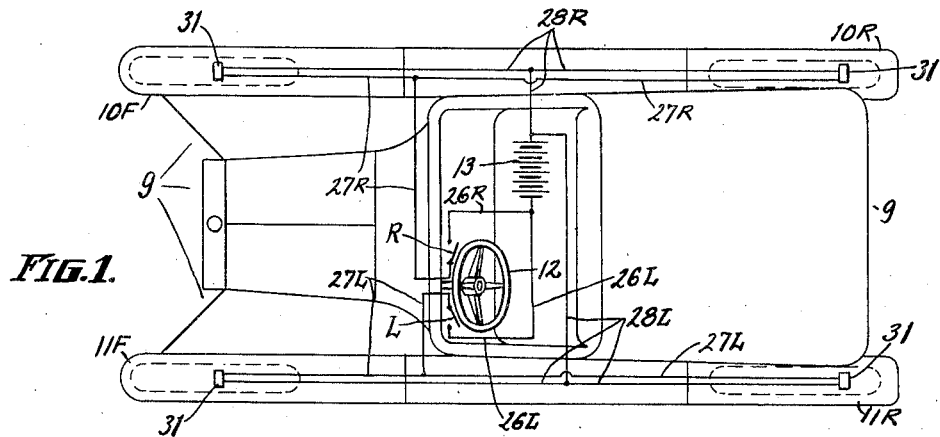
Fig. 1 is a diagrammatic top view of an automobile disclosing particularly the wiring for my device as used for four lamps, two front and two rear, and the switches of the circuits indicated only in symbols.

Referring to the drawing by reference numerals, 9 in Fig. 1 is a light line top view of an automobile on which 10F and 10R are respectively the right hand front and rear fenders or so-called mud guards, 11F and 11R the corresponding left hand mud guards, 12 is the steering wheel and 13 the storage battery or other suitable source of electricity within the car.

My device is primarily a circuit closing and opening device mounted on the rim 12ª of the steering wheel, to control the circuit to any number of suitable direction indicating lamps either mounted on both sides of a car or on all four fenders. In using two signals only, each of them is preferably of the kind throwing light to the front and rear simultaneously.

Figures 2, 3, 4:
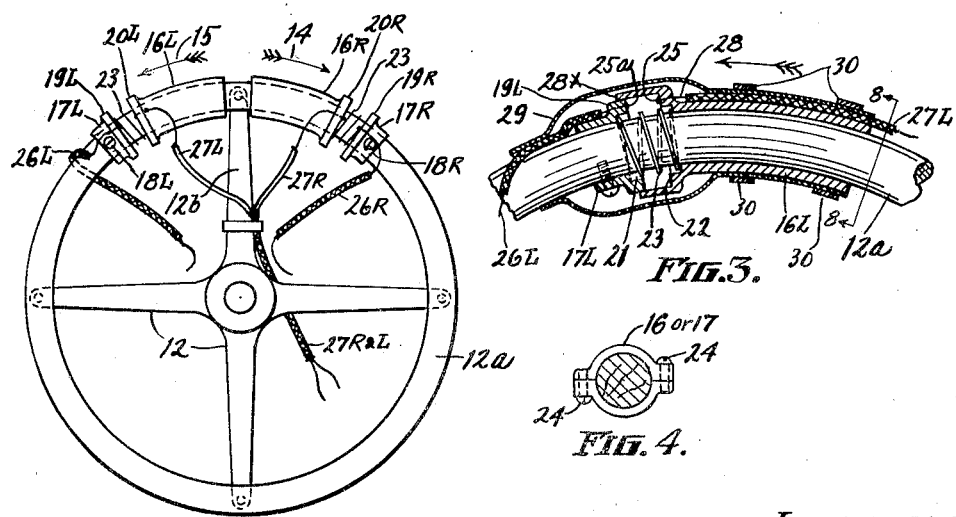
Fig. 2 is an enlarged top view of an automobile steering wheel equipped with the preferred form of circuit closing means of my device.
Fig. 3 is an enlarged and slightly modified sectional view of the left hand circuit closing device shown in Fig. 2.
Fig. 4 is a sectional detail view on line 8—8 in Fig. 3.

In Fig. 2 I have illustrated a steering wheel approximately as it appears before a driver when seated in an auto, arrow 14 indicating the direction in which the wheel is turned to make a right turn and arrow 15 indicating the direction for a left turn. This view shows the preferred form of my device, two devices being shown preferably one on each side of the normally forward spoke 12ᵇ of the hand wheel. The devices are identical in every detail and operation, counterparts of each other, and I will therefore designate the like parts of both devices with like numbers but using suffixes R and L for corresponding parts of the right and left sides. R and L in Fig. 1 indicate right and left switches of either the preferred or modified forms of my device.

16 is a split sleeve slidably mounted on the steering wheel rim 12ª and 17 is a split collar suitably secured as at 18 to the rim and adjacent one end of the sleeve. The collar and sleeve both may have an enlarged flange portion 19 and 20 respectively in their adjacent ends and said flanged portions may have recesses 21—22 (Fig. 3) to receive the ends of a compression coil spring 23 encircling the rim 12ª or otherwise arranged for normally holding the collar and sleeve separated. As previously mentioned, the collar 17 and sleeve 16 may be split and the two halves held together by means such as screws 24 (Fig. 4), but the sleeves and collars may also be respectively any slidable and securable element mounted on the hand wheel or any other suitable part fixed on the steering column.

The two adjacent faces of the sleeve and collar are provided respectively with suitable registering contacts 25—25ª, the first having a circuit wire 27 and the second a wire 26. The wires 26R and 26L carry a current of electricity from the battery 13 and the wires 27R and 27L carry said current to the right and left signal lights when the contacts 25—25ª are brought together as follows:—

When the driver desires, for example, to make a turn to the right, he grasps the sleeve 16R with his right hand and exerts pressure in the direction of arrow 14 and the sleeve is consequently pushed against the collar 17R, the contacts 25—25ª immediately closing the circuit and the right hand lights are turned on, the circuit being completed through wires 27R and 28R. Thus it will be understood that a turn is instantly signaled. By holding the wheel rigid with his left hand during the above movement the driver may give a signal before actually starting to make the turn and the signal will remain lighted as long as his right hand proceeds to turn the wheel. A signal to turn to the left is of course accomplished in like manner on the left side of the wheel. When the sleeve is released the spring 23 spreads the sleeve and collar apart, separating the contacts 25—25ª and the circuit is open.

In Fig. 3 the sleeve is shown as provided with an enlarged extension 28ˣ adapted to guard the secured collar to prevent accidental short circuit and the whole device is covered by a suitable non-conductive inclosure 29 which may be held in place by bands 30 of any suitable material. Said inclosure gives the device a neat appearance besides providing a good gripping surface for the hand of the driver.

It is readily understood that my device is also applicable to any type of electrically operated signal, including the type having pivoted signal arms which drop to a horizontal position when the circuit is closed and return to vertical position when the circuit is opened. The mounting of the lamps and the number of them are optional, varying only the installation of wiring for my control device and not affecting the scope of my invention.

What I claim is:

1. An electric contact device for automobile signal controlling mechanisms adapted to be located on a steering wheel in position to be actuated by the hands turning said wheel, said mechanism comprising an electric contact point fixed on the wheel, a slidable sleeve on the rim of the wheel and an electric contact point carried by said sleeve and arranged to touch the fixed contact point whenever the sleeve is pushed toward the latter, and a spring tending at all times to hold the sleeve with the contact points separated.

2. An electric contact device for automobile signal controlling mechanisms adapted to be located on a steering wheel in position to be actuated by the hands turning said wheel, said mechanism comprising two electrodes fixed on the wheel and two sleeve-like members mounted to slide on the rim of the wheel and having each an electrode adapted to contact with the fixed electrode nearest to it, and a spring arranged to normally separate each sliding electrode from the fixed one by pushing on the sleeve involved, each of said slidable members arranged to close contact between a pair of the electrodes by pushing the slide toward the fixed electrode.

3. An automobile signal circuit closing device comprising in combination with a steering wheel having a rim and spokes, a contact member fixed to said rim and a contact member carrying sleeve slidably mounted on said rim between one of the spokes and said fixed contact member, said spoke serving as a stop for said sleeve, spring means continuously tending to separate said contact members and hold said sleeve against said spoke, said sleeve being adapted to be moved away from said spoke to engage the contact members by the movement of an operator's hand after grasping the sleeve and rim in turning the wheel to turn the automobile in a given direction.

4. An automobile signal circuit closing device comprising in combination with a steering wheel having a rim and spokes, a contact member fixed to said rim, and a contact member carrying sleeve slidably mounted on said rim between one of the spokes and said fixed contact member, said spoke serving as a stop for said sleeve, spring means continuously tending to separate said contact members and hold said sleeve against said spoke, said sleeve being adapted to be moved away from said spoke to engage the contact members by the movement of an operator's hand after grasping the sleeve and rim in turning the wheel to turn the automobile in a given direction, and an insulating boot enclosing the fixed and movable contact members.

In testimony whereof I affix my signature.

CLARENCE H. TWETTEN.